(12) United States Patent
Bussmann et al.

(10) Patent No.: US 7,954,254 B2
(45) Date of Patent: Jun. 7, 2011

(54) METHOD FOR DRYING A PRODUCT USING A REGENERATIVE ADSORBENT

(75) Inventors: Paulus Josephus Theodorus Bussmann, Apeldoorn (NL); Rudy Matthias Henricus Heijmans, Arnhem (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 10/514,494

(22) PCT Filed: May 13, 2003

(86) PCT No.: PCT/NL03/00350
§ 371 (c)(1),
(2), (4) Date: Jul. 28, 2005

(87) PCT Pub. No.: WO03/097231
PCT Pub. Date: Nov. 27, 2003

(65) Prior Publication Data
US 2006/0010713 A1 Jan. 19, 2006

(30) Foreign Application Priority Data
May 15, 2002 (NL) .................................. 1020603

(51) Int. Cl.
*F26B 11/00* (2006.01)
(52) U.S. Cl. ............... 34/283; 34/293; 34/413; 34/381; 208/310; 585/640; 203/1
(58) Field of Classification Search .................... 34/283, 34/293, 299, 92, 380, 381, 413, 497; 203/1; 208/310; 585/640
See application file for complete search history.

(56) References Cited

U.S. PATENT DOCUMENTS

| | | | | | |
|---|---|---|---|---|---|
| 1,614,615 | A | * | 1/1927 | Stoewener et al. | 95/120 |
| 1,633,871 | A | * | 6/1927 | Prutzman | 502/22 |
| 1,680,840 | A | * | 8/1928 | Barnebey | 95/104 |
| 1,742,247 | A | * | 1/1930 | Godel | 95/146 |
| 1,927,244 | A | * | 9/1933 | Pier et al. | 502/419 |
| 1,929,381 | A | * | 10/1933 | Jaeger et al. | 562/593 |
| 2,101,857 | A | * | 12/1937 | Ipatieff et al. | 585/514 |
| 2,102,073 | A | * | 12/1937 | Ipatieff et al. | 585/517 |
| 2,102,074 | A | * | 12/1937 | Ipatieff et al. | 585/517 |
| 2,116,151 | A | * | 5/1938 | Ipatieff et al. | 585/529 |
| 2,197,007 | A | * | 4/1940 | Pew, Jr. | 208/80 |
| 2,226,535 | A | * | 12/1940 | Payne | 202/95 |
| 2,226,578 | A | * | 12/1940 | Payne | 202/95 |
| 2,227,416 | A | * | 12/1940 | Payne | 502/47 |
| 2,244,724 | A | * | 6/1941 | Payne | 202/219 |
| 2,273,350 | A | * | 2/1942 | Bedell et. al. | 208/188 |
| 2,325,577 | A | * | 7/1943 | Balcar | 95/92 |

(Continued)

FOREIGN PATENT DOCUMENTS

DE 26 31 225 1/1978

(Continued)

*Primary Examiner* — Stephen M. Gravini
(74) *Attorney, Agent, or Firm* — Browdy and Neimark, PLLC

(57) ABSTRACT

The invention relates to a method and an apparatus for drying a product using a regenerative adsorbent, more in particular to such a method which can be carried out in an energy-saving manner. According to the invention, the product is dried by bringing it into contact with an adsorbent, water being taken up form the product by the adsorbent. Subsequently, the adsorbent is regenerated with superheated steam, steam being obtained, which steam comprises at least a part of the mentioned water.

14 Claims, 2 Drawing Sheets

U.S. PATENT DOCUMENTS

| | | | | |
|---|---|---|---|---|
| 2,331,433 A * | 10/1943 | Crowley, Jr. et al. | 208/120.01 |
| 2,351,875 A * | 6/1944 | Payne | 502/47 |
| 2,384,946 A * | 9/1945 | Marisic | 502/8 |
| 2,390,917 A * | 12/1945 | Breth et al. | 208/297 |
| 2,391,944 A * | 1/1946 | Carlsmith | 208/151 |
| 2,395,491 A * | 2/1946 | Mavity | 585/828 |
| 2,422,262 A * | 6/1947 | Russell | 422/143 |
| 2,425,807 A * | 8/1947 | Jahnig | 208/150 |
| 2,429,545 A * | 10/1947 | Bergstrom | 208/168 |
| 2,432,745 A * | 12/1947 | Gary | 208/155 |
| 2,433,426 A * | 12/1947 | Capell et al. | 252/190 |
| 2,434,419 A * | 1/1948 | Laughlin et al. | 34/514 |
| 2,440,623 A * | 4/1948 | Voorhees | 414/800 |
| 2,458,350 A * | 1/1949 | Crowley, Jr. | 208/169 |
| 2,458,358 A * | 1/1949 | Evans | 502/45 |
| 2,458,499 A * | 1/1949 | Bergstrom | 208/168 |
| 2,470,339 A * | 5/1949 | Claussen et al. | 208/310 R |
| 2,472,776 A * | 6/1949 | Payne | 502/405 |
| 2,480,628 A * | 8/1949 | Bodkin | 502/263 |
| 2,487,796 A * | 11/1949 | Evans | 208/74 |
| 2,487,805 A * | 11/1949 | Hermanson | 208/310 R |
| 2,492,167 A * | 12/1949 | Griest et al. | 502/8 |
| 2,509,014 A * | 5/1950 | Payne et al. | 502/300 |
| 2,518,409 A * | 8/1950 | Williamson | 34/352 |
| 2,529,624 A * | 11/1950 | Murray | 518/722 |
| 2,542,459 A * | 2/1951 | Bannon | 526/237 |
| 2,549,104 A * | 4/1951 | Lechthaler | 95/110 |
| 2,554,426 A * | 5/1951 | Strunk et al. | 422/144 |
| 2,562,334 A * | 7/1951 | Roberts | 34/473 |
| 2,569,595 A * | 10/1951 | Adams et al. | 208/272 |
| 2,570,974 A * | 10/1951 | Neuhart | 34/364 |
| 2,571,380 A * | 10/1951 | Penick | 502/31 |
| 2,588,402 A * | 3/1952 | Milliken, Jr. | 502/8 |
| 2,632,528 A * | 3/1953 | Berg et al. | 95/112 |
| 2,635,707 A * | 4/1953 | Gilmore | 96/122 |
| 2,636,575 A * | 4/1953 | Watson | 95/111 |
| 2,656,010 A * | 10/1953 | Thodos | 95/111 |
| 2,701,786 A * | 2/1955 | Evans et al. | 208/300 |
| 2,709,674 A * | 5/1955 | Bergstrom | 208/305 |
| 2,722,999 A * | 11/1955 | Bratzler et al. | 95/112 |
| 2,724,190 A * | 11/1955 | Bergstrom | 34/578 |
| 2,761,575 A * | 9/1956 | Visconty | 414/805 |
| 2,766,191 A * | 10/1956 | Penick | 208/300 |
| 2,776,188 A * | 1/1957 | Gilbert | 502/342 |
| 2,783,187 A * | 2/1957 | Odell | 208/163 |
| 2,790,248 A * | 4/1957 | Dow | 34/549 |
| 2,809,938 A * | 10/1957 | Goren et al. | 502/426 |
| 2,813,352 A * | 11/1957 | Payne et al. | 34/370 |
| 2,843,552 A * | 7/1958 | Lechthaler et al. | 502/320 |
| 2,851,428 A * | 9/1958 | Wayne et al. | 502/41 |
| 2,859,170 A * | 11/1958 | Dickens et al. | 208/85 |
| 2,859,173 A * | 11/1958 | Hess et al. | 208/92 |
| 2,870,088 A * | 1/1959 | Bergstrom | 208/305 |
| 2,886,508 A * | 5/1959 | Hess et al. | 208/79 |
| 2,900,349 A * | 8/1959 | Schwartz | 252/194 |
| 2,904,607 A * | 9/1959 | Mattox et al. | 585/467 |
| 2,908,639 A * | 10/1959 | Carter et al. | 208/310 R |
| 2,914,486 A * | 11/1959 | Schwartz | 502/330 |
| 2,917,449 A * | 12/1959 | Christensen et al. | 208/64 |
| 2,938,874 A * | 5/1960 | Rosinski | 502/208 |
| 2,964,481 A * | 12/1960 | Schwartz et al. | 502/8 |
| 2,966,466 A * | 12/1960 | Schwartz | 502/8 |
| 2,967,143 A * | 1/1961 | Riordan et al. | 208/79 |
| 2,982,719 A * | 5/1961 | Gilbert et al. | 502/263 |
| 3,095,384 A * | 6/1963 | Jenkins et al. | 502/60 |
| 3,116,130 A * | 12/1963 | Miller | 95/8 |
| 3,150,079 A * | 9/1964 | Berlin | 585/825 |
| 3,197,415 A * | 7/1965 | Hendrix | 208/340 |
| 3,210,253 A * | 10/1965 | Huntington | 376/171 |
| 3,211,673 A * | 10/1965 | Luntz et al. | 502/428 |
| 3,240,830 A * | 3/1966 | Dye | 585/822 |
| 3,283,803 A * | 11/1966 | Phillips, Jr. et al. | 159/47.1 |
| 3,332,854 A * | 7/1967 | Duckstein | 202/174 |
| 3,344,086 A * | 9/1967 | Cramer et al. | 502/70 |
| 3,374,183 A * | 3/1968 | Cooper | 502/346 |
| 3,433,581 A * | 3/1969 | Hirschler, Jr. et al. | 423/213.2 |
| 3,471,521 A * | 10/1969 | Junker | 549/248 |
| 3,507,051 A * | 4/1970 | Calvert et al. | 34/340 |
| 3,596,436 A * | 8/1971 | Dassesse | 95/11 |
| 3,619,130 A * | 11/1971 | Ventriglio et al. | 95/115 |
| 3,620,969 A * | 11/1971 | Turnock et al. | 208/245 |
| 3,644,432 A * | 2/1972 | Hoch | 549/541 |
| 3,647,716 A * | 3/1972 | Koches | 502/41 |
| 3,694,344 A * | 9/1972 | Munro | 208/108 |
| 3,729,902 A * | 5/1973 | Ventriglio et al. | 96/127 |
| 3,766,660 A * | 10/1973 | Settlemyer | 34/333 |
| 3,864,363 A * | 2/1975 | Kile | 549/505 |
| 3,873,670 A * | 3/1975 | Dugan et al. | 423/210.5 |
| 3,923,867 A * | 12/1975 | Baerns et al. | 560/77 |
| 3,945,811 A * | 3/1976 | Beasley et al. | 95/70 |
| 4,072,480 A * | 2/1978 | Wagner | 95/136 |
| 4,102,812 A * | 7/1978 | Robinson et al. | 502/428 |
| 4,124,528 A * | 11/1978 | Modell | 210/670 |
| 4,125,946 A * | 11/1978 | Prager | 34/80 |
| 4,175,334 A * | 11/1979 | Gibert | 34/286 |
| 4,175,932 A * | 11/1979 | Durr et al. | 95/142 |
| 4,195,649 A * | 4/1980 | Noguchi et al. | 131/342 |
| 4,248,706 A * | 2/1981 | Repik | 210/673 |
| 4,254,557 A * | 3/1981 | Mayer et al. | 34/249 |
| 4,254,558 A * | 3/1981 | Mayer | 34/249 |
| 4,255,403 A * | 3/1981 | Mayer et al. | 423/244.06 |
| 4,259,304 A * | 3/1981 | Steiner | 423/244.03 |
| 4,266,957 A * | 5/1981 | Isalski | 62/638 |
| 4,283,204 A * | 8/1981 | Savage | 95/27 |
| 4,290,208 A * | 9/1981 | Hellman | 34/352 |
| 4,292,285 A * | 9/1981 | Nakao et al. | 423/210 |
| 4,294,590 A * | 10/1981 | Linde et al. | 95/161 |
| 4,319,892 A * | 3/1982 | Waghorne et al. | 95/27 |
| 4,319,893 A * | 3/1982 | Hatch et al. | 95/27 |
| 4,338,198 A * | 7/1982 | Brown | 210/673 |
| 4,367,595 A * | 1/1983 | Szucs et al. | 34/473 |
| 4,378,977 A * | 4/1983 | Linde et al. | 95/161 |
| 4,430,094 A * | 2/1984 | Gorzegno | 48/76 |
| 4,475,295 A * | 10/1984 | Hussmann | 96/125 |
| 4,488,866 A * | 12/1984 | Schirmer et al. | 431/4 |
| 4,548,623 A * | 10/1985 | Naske | 96/230 |
| 4,586,940 A * | 5/1986 | Stubenvoll | 95/207 |
| 4,725,380 A * | 2/1988 | Pinto | 252/376 |
| 4,732,596 A * | 3/1988 | Nicholas et al. | 62/626 |
| 4,741,833 A * | 5/1988 | Sheikh | 210/665 |
| 4,751,336 A * | 6/1988 | Jezl et al. | 585/324 |
| 4,754,091 A * | 6/1988 | Jezl et al. | 585/322 |
| 4,754,093 A * | 6/1988 | Jezl et al. | 585/500 |
| 4,805,317 A * | 2/1989 | Inglis et al. | 34/259 |
| 4,855,276 A * | 8/1989 | Osborne et al. | 502/415 |
| 4,886,928 A * | 12/1989 | Imai et al. | 585/660 |
| 4,914,075 A * | 4/1990 | Bricker et al. | 502/330 |
| 4,918,837 A * | 4/1990 | Graff | 34/80 |
| 4,966,611 A * | 10/1990 | Schumacher et al. | 95/18 |
| 4,980,138 A * | 12/1990 | Samish | 423/239.1 |
| 5,035,065 A * | 7/1991 | Parkinson | 34/92 |
| 5,108,968 A * | 4/1992 | Ellingham et al. | 502/43 |
| 5,176,798 A * | 1/1993 | Rodden | 202/159 |
| 5,230,872 A * | 7/1993 | Tiggelbeck et al. | 422/261 |
| 5,233,118 A * | 8/1993 | Bricker et al. | 585/660 |
| 5,277,716 A * | 1/1994 | Boppart et al. | 134/10 |
| 5,335,426 A * | 8/1994 | Settlemyer et al. | 34/80 |
| 5,338,450 A * | 8/1994 | Maurer | 210/286 |
| 5,389,691 A * | 2/1995 | Cha et al. | 521/41 |
| 5,446,973 A * | 9/1995 | Andersson et al. | 34/80 |
| 5,470,384 A * | 11/1995 | Cha et al. | 106/284.03 |
| 5,473,094 A * | 12/1995 | Ooms et al. | 558/270 |
| 5,489,696 A * | 2/1996 | Mendoza-Frohn et al. | 549/230 |
| 5,518,626 A * | 5/1996 | Birbara et al. | 210/670 |
| 5,536,891 A * | 7/1996 | Beard, Jr. | 570/262 |
| 5,565,609 A * | 10/1996 | Hirowatari et al. | 562/485 |
| 5,589,599 A * | 12/1996 | McMullen et al. | 585/240 |
| 5,639,436 A * | 6/1997 | Benson et al. | 423/502 |
| 5,659,974 A * | 8/1997 | Graeff | 34/378 |
| 5,669,960 A * | 9/1997 | Couche | 95/96 |
| 5,735,948 A * | 4/1998 | Cha et al. | 106/724 |
| 5,744,686 A * | 4/1998 | Gajda | 585/823 |
| 5,852,880 A * | 12/1998 | Harrison | 34/92 |
| 5,879,433 A * | 3/1999 | Gallup et al. | 95/186 |
| 5,908,940 A * | 6/1999 | Lane et al. | 549/413 |
| 5,915,535 A * | 6/1999 | Henrekin-Jordan | 2/195.2 |
| 5,915,816 A * | 6/1999 | Graff | 34/378 |

| Patent | Kind | Date | Inventor | Class |
|---|---|---|---|---|
| 5,925,156 A * | | 7/1999 | Motoki et al. | 55/487 |
| 5,942,650 A * | | 8/1999 | Gajda | 585/448 |
| 5,993,502 A * | | 11/1999 | Motoki et al. | 55/487 |
| 6,007,606 A * | | 12/1999 | Baksh et al. | 95/98 |
| 6,039,774 A * | | 3/2000 | McMullen et al. | 48/102 A |
| 6,084,061 A * | | 7/2000 | Lawson et al. | 530/230 |
| 6,121,179 A * | | 9/2000 | McBrayer et al. | 502/23 |
| 6,139,604 A * | | 10/2000 | Gottzmann et al. | 95/54 |
| 6,148,535 A * | | 11/2000 | Porter | 34/80 |
| 6,156,102 A * | | 12/2000 | Conrad et al. | 95/172 |
| 6,161,306 A * | | 12/2000 | Clodic | 34/321 |
| 6,322,612 B1 * | | 11/2001 | Sircar et al. | 95/97 |
| 6,434,857 B1 * | | 8/2002 | Anderson et al. | 34/595 |
| 6,503,299 B2 * | | 1/2003 | Baksh et al. | 95/98 |
| 6,526,674 B1 * | | 3/2003 | Fielding et al. | 34/80 |
| 6,568,100 B1 * | | 5/2003 | Fielding et al. | 34/80 |
| 6,579,996 B2 * | | 6/2003 | Peter et al. | 554/15 |
| 6,657,041 B1 * | | 12/2003 | Machida et al. | 528/328 |
| 6,756,340 B2 * | | 6/2004 | Voskoboynikov et al. | 502/328 |
| 6,756,516 B2 * | | 6/2004 | Mees et al. | 585/640 |
| 6,897,180 B2 * | | 5/2005 | Mees et al. | 502/214 |
| 6,916,965 B2 * | | 7/2005 | Mees et al. | 585/640 |
| 6,932,155 B2 * | | 8/2005 | Vinegar et al. | 166/245 |
| 6,932,956 B2 * | | 8/2005 | Jia | 423/569 |
| 6,951,065 B2 * | | 10/2005 | Graeff | 34/364 |
| 6,969,123 B2 * | | 11/2005 | Vinegar et al. | 299/3 |
| 6,991,045 B2 * | | 1/2006 | Vinegar et al. | 175/45 |
| 7,051,808 B1 * | | 5/2006 | Vinegar et al. | 166/250.1 |
| 7,063,145 B2 * | | 6/2006 | Veenstra et al. | 166/250.01 |
| 7,066,257 B2 * | | 6/2006 | Wellington et al. | 166/272.2 |
| 7,077,198 B2 * | | 7/2006 | Vinegar et al. | 166/245 |
| 7,086,465 B2 * | | 8/2006 | Wellington et al. | 166/272.1 |
| 7,090,013 B2 * | | 8/2006 | Wellington | 166/267 |
| 7,100,994 B2 * | | 9/2006 | Vinegar et al. | 299/7 |
| 7,114,566 B2 * | | 10/2006 | Vinegar et al. | 166/256 |
| 7,128,153 B2 * | | 10/2006 | Vinegar et al. | 166/285 |
| 7,156,176 B2 * | | 1/2007 | Vinegar et al. | 166/302 |
| 7,165,615 B2 * | | 1/2007 | Vinegar et al. | 166/302 |
| 7,193,122 B2 * | | 3/2007 | Mees et al. | 585/640 |
| 7,259,287 B2 * | | 8/2007 | Beech et al. | 585/640 |
| 7,276,149 B2 * | | 10/2007 | Beech et al. | 208/154 |
| 7,374,742 B2 * | | 5/2008 | Geosits et al. | 423/573.1 |
| 7,375,142 B2 * | | 5/2008 | Pearson | 518/706 |
| 7,377,959 B2 * | | 5/2008 | Kozaki et al. | 95/142 |
| 7,407,121 B2 * | | 8/2008 | Kerns et al. | 241/5 |
| 7,422,810 B2 * | | 9/2008 | Venkataraman et al. | 429/411 |
| 7,456,326 B2 * | | 11/2008 | Howard | 568/903 |
| 7,461,691 B2 * | | 12/2008 | Vinegar et al. | 166/60 |
| 7,516,785 B2 * | | 4/2009 | Kaminsky | 166/245 |
| 7,516,787 B2 * | | 4/2009 | Kaminsky | 166/250.1 |
| 7,632,476 B2 * | | 12/2009 | Shah et al. | 423/220 |
| 7,647,971 B2 * | | 1/2010 | Kaminsky | 166/302 |
| 7,647,972 B2 * | | 1/2010 | Kaminsky | 166/302 |
| 7,669,657 B2 * | | 3/2010 | Symington et al. | 166/272.2 |
| 7,704,618 B2 * | | 4/2010 | Venkataraman et al. | 429/411 |
| 7,708,213 B2 * | | 5/2010 | Kerns et al. | 241/5 |
| 2002/0014153 A1 * | | 2/2002 | Baksh et al. | 95/96 |
| 2002/0111504 A1 * | | 8/2002 | Peter et al. | 554/185 |
| 2003/0000106 A1 * | | 1/2003 | Anderson et al. | 34/598 |
| 2003/0004056 A1 * | | 1/2003 | Mees et al. | 502/208 |
| 2003/0045734 A1 * | | 3/2003 | Weisbeck et al. | 549/532 |
| 2003/0149321 A1 * | | 8/2003 | Mees et al. | 585/640 |
| 2003/0173072 A1 * | | 9/2003 | Vinegar et al. | 166/66.5 |
| 2003/0173085 A1 * | | 9/2003 | Vinegar et al. | 166/302 |
| 2003/0183390 A1 * | | 10/2003 | Veenstra et al. | 166/302 |
| 2003/0191351 A1 * | | 10/2003 | Voskoboynikov et al. | 585/660 |
| 2003/0192691 A1 * | | 10/2003 | Vinegar et al. | 166/250.12 |
| 2003/0192693 A1 * | | 10/2003 | Wellington | 166/267 |
| 2003/0196788 A1 * | | 10/2003 | Vinegar et al. | 166/57 |
| 2003/0196789 A1 * | | 10/2003 | Wellington et al. | 166/64 |
| 2003/0196801 A1 * | | 10/2003 | Vinegar et al. | 166/263 |
| 2003/0196810 A1 * | | 10/2003 | Vinegar et al. | 166/300 |
| 2003/0201098 A1 * | | 10/2003 | Karanikas et al. | 166/53 |
| 2003/0202934 A1 * | | 10/2003 | Voskoboynikov et al. | 423/651 |
| 2003/0205378 A1 * | | 11/2003 | Wellington et al. | 166/302 |
| 2004/0020642 A1 * | | 2/2004 | Vinegar et al. | 166/245 |
| 2004/0040715 A1 * | | 3/2004 | Wellington et al. | 166/302 |
| 2004/0045187 A1 * | | 3/2004 | Curry et al. | 34/595 |
| 2004/0076570 A1 * | | 4/2004 | Jia | 423/244.01 |
| 2004/0157732 A1 * | | 8/2004 | Mees et al. | 502/214 |
| 2004/0211569 A1 * | | 10/2004 | Vinegar et al. | 166/380 |
| 2005/0033101 A1 * | | 2/2005 | Voskoboynikov et al. | 585/660 |
| 2005/0035027 A1 * | | 2/2005 | Beech et al. | 208/154 |
| 2005/0038306 A1 * | | 2/2005 | Beech et al. | 585/446 |
| 2005/0091872 A1 * | | 5/2005 | Graeff | 34/359 |
| 2005/0092483 A1 * | | 5/2005 | Vinegar et al. | 166/60 |
| 2005/0107581 A1 * | | 5/2005 | Rosenbaum | 528/500 |
| 2005/0132598 A1 * | | 6/2005 | Reddy | 34/448 |
| 2005/0132883 A1 * | | 6/2005 | Su et al. | 95/235 |
| 2005/0135983 A1 * | | 6/2005 | Geosits et al. | 423/242.1 |
| 2005/0148462 A1 * | | 7/2005 | Mees et al. | 502/214 |
| 2005/0164051 A1 * | | 7/2005 | Venkataraman et al. | 429/17 |
| 2005/0188616 A1 * | | 9/2005 | Bizjak et al. | 48/127.9 |
| 2005/0203327 A1 * | | 9/2005 | Jovanovic et al. | 585/820 |
| 2005/0262720 A1 * | | 12/2005 | Rane et al. | 34/330 |
| 2006/0010713 A1 * | | 1/2006 | Bussmann et al. | 34/473 |
| 2006/0057060 A1 * | | 3/2006 | Sun et al. | 423/651 |
| 2006/0096850 A1 * | | 5/2006 | Kozaki et al. | 204/157.3 |
| 2006/0160455 A1 * | | 7/2006 | Sugyo et al. | 442/417 |
| 2006/0186234 A1 * | | 8/2006 | Kerns et al. | 241/16 |
| 2006/0199051 A1 * | | 9/2006 | Bai et al. | 429/17 |
| 2007/0010588 A1 * | | 1/2007 | Pearson | 518/701 |
| 2007/0010589 A1 * | | 1/2007 | Pearson | 518/702 |
| 2007/0209799 A1 * | | 9/2007 | Vinegar et al. | 166/302 |
| 2007/0212286 A1 * | | 9/2007 | Shah et al. | 423/220 |
| 2007/0232706 A1 * | | 10/2007 | Shah et al. | 518/703 |
| 2008/0087421 A1 * | | 4/2008 | Kaminsky | 166/245 |
| 2008/0087426 A1 * | | 4/2008 | Kaminsky | 166/271 |
| 2008/0127822 A1 * | | 6/2008 | England | 95/132 |
| 2008/0207970 A1 * | | 8/2008 | Meurer et al. | 585/24 |
| 2008/0209807 A1 * | | 9/2008 | Tsangaris et al. | 48/89 |
| 2008/0213144 A1 * | | 9/2008 | Howard | 423/210 |
| 2008/0230219 A1 * | | 9/2008 | Kaminsky | 166/248 |
| 2008/0245906 A1 * | | 10/2008 | Kerns et al. | 241/24.31 |
| 2008/0267842 A1 * | | 10/2008 | Pearson | 422/187 |
| 2008/0271885 A1 * | | 11/2008 | Kaminsky | 166/245 |
| 2008/0283241 A1 * | | 11/2008 | Kaminsky et al. | 166/245 |
| 2008/0289819 A1 * | | 11/2008 | Kaminsky et al. | 166/256 |
| 2008/0290719 A1 * | | 11/2008 | Kaminsky et al. | 299/3 |
| 2008/0311445 A1 * | | 12/2008 | Venkataraman et al. | 429/17 |
| 2009/0050319 A1 * | | 2/2009 | Kaminsky et al. | 166/257 |
| 2009/0101348 A1 * | | 4/2009 | Kaminsky | 166/302 |
| 2009/0107679 A1 * | | 4/2009 | Kaminsky | 166/302 |
| 2009/0178408 A1 * | | 7/2009 | Brugerolle et al. | 60/645 |
| 2009/0230359 A1 * | | 9/2009 | Guvelioglu et al. | 252/373 |
| 2009/0246107 A1 * | | 10/2009 | England | 423/230 |
| 2009/0246118 A1 * | | 10/2009 | Drnevich et al. | 423/650 |
| 2009/0252658 A1 * | | 10/2009 | Ramler et al. | 422/140 |
| 2009/0261017 A1 * | | 10/2009 | Iqbal et al. | 208/128 |
| 2009/0317323 A1 * | | 12/2009 | Doshi et al. | 423/648.1 |
| 2010/0015039 A1 * | | 1/2010 | Doshi et al. | 423/652 |
| 2010/0047160 A1 * | | 2/2010 | Allam | 423/651 |
| 2010/0074839 A1 * | | 3/2010 | Drnevich et al. | 423/655 |
| 2010/0087686 A1 * | | 4/2010 | Fong et al. | 568/795 |
| 2010/0089585 A1 * | | 4/2010 | Kaminsky | 166/302 |
| 2010/0095742 A1 * | | 4/2010 | Symington et al. | 73/23.35 |
| 2010/0121125 A1 * | | 5/2010 | Hippo et al. | 585/733 |
| 2010/0124583 A1 * | | 5/2010 | Medoff | 426/2 |
| 2010/0126727 A1 * | | 5/2010 | Vinegar et al. | 166/302 |
| 2010/0155295 A1 * | | 6/2010 | Hedrick et al. | 208/68 |
| 2010/0158764 A1 * | | 6/2010 | Hedrick et al. | 422/134 |
| 2010/0158776 A1 * | | 6/2010 | Drnevich et al. | 423/220 |
| 2010/0203417 A1 * | | 8/2010 | Venkataraman et al. | 429/465 |
| 2010/0212457 A1 * | | 8/2010 | Drnevich et al. | 75/414 |
| 2010/0242722 A1 * | | 9/2010 | Belanger et al. | 95/8 |
| 2010/0267905 A1 * | | 10/2010 | Sun et al. | 526/67 |
| 2010/0267926 A1 * | | 10/2010 | Sun et al. | 528/405 |
| 2010/0282125 A1 * | | 11/2010 | Kerns et al. | 106/31.91 |
| 2010/0284892 A1 * | | 11/2010 | Grover et al. | 423/437.1 |

FOREIGN PATENT DOCUMENTS

| | | |
|---|---|---|
| DE | 30 30 967 | 3/1982 |
| DE | 3535172 A1 * | 4/1987 |
| DE | 4000142 A1 * | 7/1991 |
| DE | 4204573 A1 * | 8/1993 |
| DE | 4239520 A1 * | 5/1994 |
| DE | 195 31 933 | 2/1997 |
| DE | 197 19 395 A1 | 11/1998 |

| | | | | | | | | | |
|---|---|---|---|---|---|---|---|---|---|
| EP | | 83825 | A1 | * | 7/1983 | JP | 02157016 A | * | 6/1990 |
| EP | | 289877 | A1 | * | 11/1988 | JP | 02169085 A | * | 6/1990 |
| FR | | 2807027 | A1 | * | 10/2001 | JP | 05123667 A | * | 5/1993 |
| GB | | 992871 | | | 3/1963 | JP | 05337159 A | * | 12/1993 |
| GB | | 2220200 | A | * | 1/1990 | JP | 06226046 A | * | 8/1994 |
| JP | | 54058695 | A | * | 5/1979 | JP | 07313874 A | * | 12/1995 |
| JP | | 54129549 | A | * | 10/1979 | JP | 08243389 A | * | 9/1996 |
| JP | | 55078087 | A | * | 6/1980 | JP | 09066213 A | * | 3/1997 |
| JP | | 56163726 | A | * | 12/1981 | JP | 10128063 A | * | 5/1998 |
| JP | | 57087815 | A | * | 6/1982 | JP | 11179137 A | * | 7/1999 |
| JP | | 57196709 | A | * | 12/1982 | JP | 2000325740 A | * | 11/2000 |
| JP | | 58064117 | A | * | 4/1983 | JP | 2001239127 A | * | 9/2001 |
| JP | | 58133306 | A | * | 8/1983 | JP | 2006166766 A | * | 6/2006 |
| JP | | 60082124 | A | * | 5/1985 | JP | 2009262121 A | * | 11/2009 |
| JP | | 60145901 | A | * | 8/1985 | JP | 2009273975 A | * | 11/2009 |
| JP | | 61245821 | A | * | 11/1986 | WO | WO 00/02822 | | 1/2000 |
| JP | | 61254535 | A | * | 11/1986 | WO | WO 03097231 A1 | * | 11/2003 |
| JP | | 62068530 | A | * | 3/1987 | | | | |
| JP | | 63252528 | A | * | 10/1988 | | | | |

* cited by examiner

METHOD FOR DRYING A PRODUCT USING A REGENERATIVE ADSORBENT

FIELD OF THE INVENTION

The invention relates to a method for drying a product using a regenerative adsorbent, more in particular to such a method which can be carried out in an energy-saving manner. The invention also relates to an apparatus suitable for carrying out such a method.

BACKGROUND OF THE INVENTION

A method for drying water-containing products using an adsorbent is, for instance, described in WO-A-00/02822. According to this known method, an adsorbent in the form of zeolite A is brought into contact with the watery substance to be dried, which may or may not first be dewatered and/or preheated. In this method, the zeolite adsorbs water from the substance, while adsorption heat is produced, so that more water evaporates. Subsequently, the thus obtained dried substance is separated from the zeolite, and the zeolite is regenerated by heating in an oven.

A drawback of this known method is that in the regeneration step a substantial amount of heat must be supplied to regenerate the zeolite.

SUMMARY OF THE INVENTION

The present invention contemplates providing a method for drying a product which can be carried out in an energy-saving manner.

It has been found that if the regeneration step is carried out using superheated steam, a number of advantages is obtained. Therefore, the present invention relates to a method for drying a product, comprising the steps of:
  bringing the wet product into contact with an adsorbent, water being taken up from the product by the adsorbent;
  regenerating the mentioned adsorbent with superheated steam, steam being obtained, which steam comprises at least a part of the mentioned water.

The wet product may be either a final product to be dried, such as foods, for instance starch or carrots, or chemical products, for instance pigments or cellulose derivatives and sludges, which are mixed with the adsorbent (direct drying); or a wet gas stream originating from a previous drying step (indirect drying).

With the method of the invention, inter alia a product stream of steam is obtained, which stream comprises the water removed from the dried product by means of the adsorbent in the form of steam. An important advantage is that this steam stream can be employed for the purposes conventional in the (agro-)process industry, for instance for heating. If, for instance for the regeneration step, the starting steam stream is a steam stream of 5 bara/160° C. (slightly superheated), this stream may first be superheated to the desired temperature, for instance 300° C. Subsequently, with this superheated steam, the regeneration step is carried out, while the temperature of the steam falls to, for instance, 160° C. Because the water is released from the adsorbent in the form of steam, the amount of steam obtained with this released part increases. In this manner, therefore, a steam stream of 150° C./5 bara is obtained, which is, for instance, 105 wt. % of the original ingoing steam stream. This steam has sufficient energy content to be employed elsewhere for process-technological purposes.

With special advantage, the invention can be used for drying a gas stream originating from a drying step, preferably from a low temperature drying step. This embodiment is particularly suitable if temperature-sensitive products, such as specific foods, must be dried. According to this embodiment, the food or other product to be dried is brought into contact with a suitable gas, such as nitrogen, or if the product allows it, air, at a suitable temperature. The temperature must be selected such that, on the one hand, effective drying is obtained and, on the other hand, the food or other product to be dried does not undergo appreciable thermic degradation. This product temperature is typically 30-90° C., for instance 60° C., for drying starch. Of course, this temperature differs per case. Thus, the method according to the invention is also very suitable for freeze drying products, the product temperature typically ranging between −40° C. and −10° C.

The low temperature drying step can be carried out in known per se apparatuses suitable to that end, for instance in a column. According to the invention, the wet gas is then brought into contact with the adsorbent, water being taken up from the wet gas by the adsorbent and a dry gas stream being obtained again, which dry gas stream can be applied again in the low temperature drying step. The water-loaded adsorbent is regenerated again with superheated steam, in the above-described manner.

An advantage of this embodiment, in which a wet product is first dried with a gas stream, after which this gas stream is dried with a regenerative adsorbent, compared to bringing the food or other product to be dried directly into contact with the adsorbent, is that the adsorbent need not be separated from the food (or other product).

It is particularly advantageous if the embodiment is applied when freeze drying products.

It is particularly advantageous if in this embodiment the step of bringing the wet gas stream into contact with the adsorbent is carried out under such conditions that in this step a dry gas is obtained with a temperature suitable to be directly applied in the low temperature drying step, that is to say without first needing to cool or heat this gas stream. To obtain a dry gas of a desired temperature, process factors, such as temperature of the adsorbent, ratio of adsorbent to wet gas and contact time, can be varied. It is noted that through the released adsorption heat the gas heats up.

Figure 1:
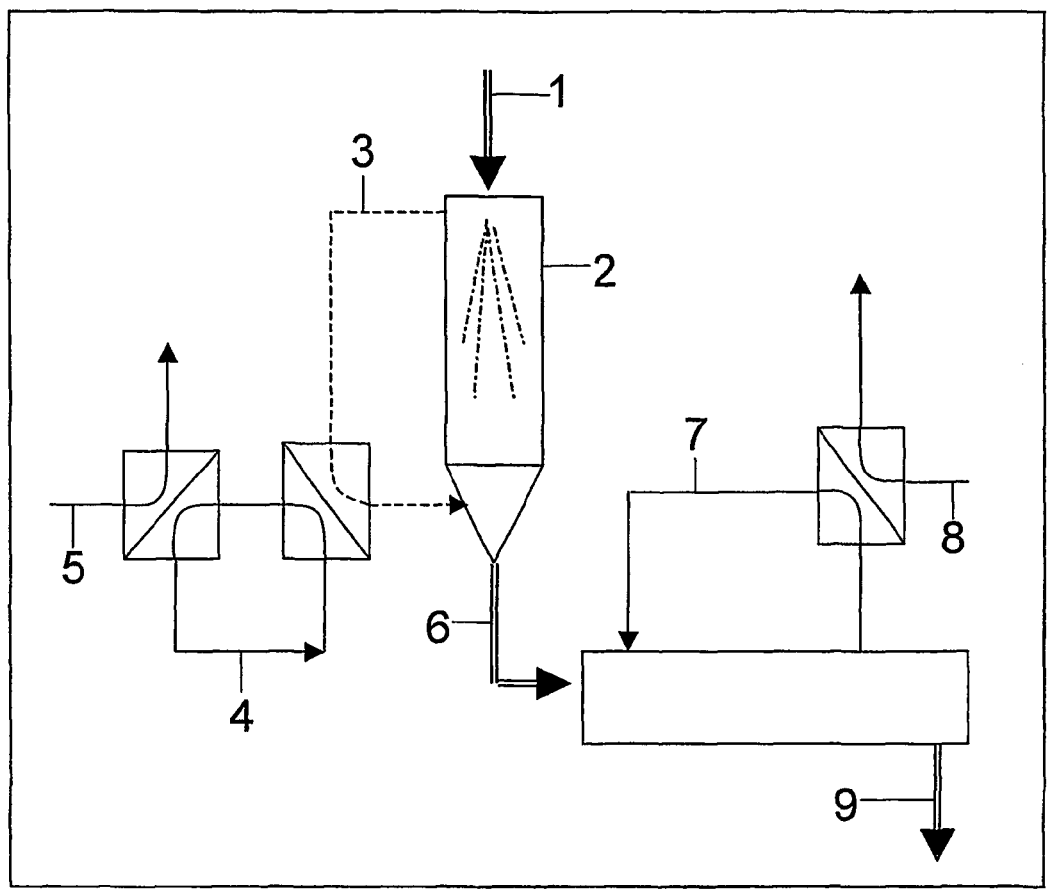
FIG. 1 illustrates an apparatus for a combination of direct and indirect drying.

Also, it is possible to apply a combination of direct and indirect drying, as indicated in FIG. 1. In this figure, the product to be dried (1), for instance a slurry of lactose, is introduced into a spray tower (2) via a sprayer. The drying medium (for instance nitrogen) circulates countercurrently with the sprayed slurry, so that a first drying step is effected. The wet drying medium is then dried via an adsorbent (4), as indicated. The thus obtained wet adsorbent is dried by steam, as described above, steam being obtained which comprises the water.

The product (6) at the bottom of the column may, if desired, be subjected to a second drying step according to the invention, in which it is, for instance, mixed with another adsorbent (7), as indicated in FIG. 1. The dried product is then separated from the adsorbent (7), for instance by means of sieving or other separation techniques for solid substances. In this step, a wet stream of adsorbent is obtained, which, as described above, is dried by steam. Also, a dry product stream (9) is obtained, which product has therefore undergone two drying steps according to the invention.

As adsorbent, the conventional adsorbents may be applied. Examples thereof are silica gel, activated alumina, activated carbon, carbon molecular sieves and zeolites. Preferably applied is an adsorbent which comprises a zeolite. Surprisingly, it has been found that in contrast to what is generally assumed in the literature by Ruthven, D. M., 1984, Principles of Adsorption and Adsorption Processes, Chapter 1.5, John Wiley & Sons, New York, no degeneration of the zeolite structure occurs if this is brought into contact with superheated steam of temperatures suitable according to the invention. At very high temperatures, degeneration of the zeolite can occur. For this reason, the temperature of the superheated steam preferably ranges between 100 and 450° C., with more preference between 150 and 400° C. With special preference, the adsorbent applied is one or more zeolites of the 3A, 4A and/or 5A type.

Because according to the invention the removed water is obtained in the form of HP/HT steam, a substantial saving in the energy cost can be obtained, which can rise to as much as 70%.

As stated, the obtained HP/HT steam stream can be employed for different applications, such as heating purposes. Also, it is possible to return a part of the obtained steam stream, after heating, again to the mentioned regeneration step for regenerating the adsorbent.

An apparatus for carrying out a method according to the invention comprises a space for bringing a product into contact with an adsorbent; and a space for regenerating the mentioned adsorbent with superheated steam, steam being obtained, which steam comprises at least a part of the mentioned water.

The invention can be applied for drying different products. It can be very suitably applied for drying foods or starting materials in the food industry, such as, for instance, starch, starch derivatives, proteins and fibers originating from starch-containing crops.

Figure 2:
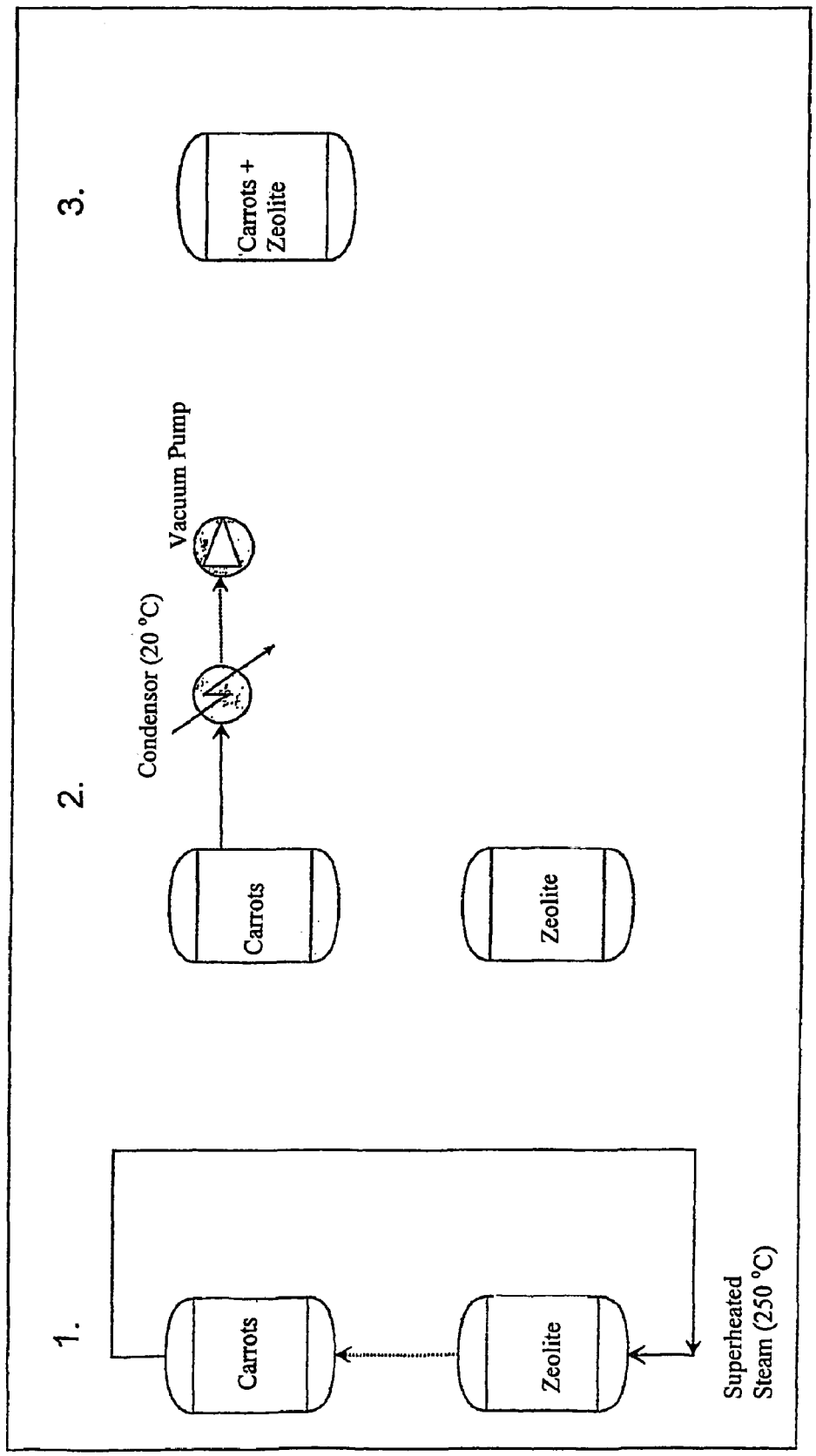
FIG. 2 illustrates and apparatus for drying including supplemental steam and zeolite.

The invention can also be used for freeze drying products, in particular foods. With reference to FIG. 2, the freeze drying of a product such as, for instance, carrots, can be carried out as follows.

1. Steam Drying

During the first phase, both the adsorbent (for instance zeolite) and the carrots are dried. This can be done in series or parallel. The carrots are dried so far that the texture of the product is retained. To retain the quality of the carrots, it is important that no air is present in the system at the end of this phase. The pressure during steam drying is atmospheric or less.

2. Vacuumizing

By condensing the steam in the carrot vessel, a reduced pressure will be formed. As a result, water will evaporate from the product, so that the product dries further and cools to about 20° C. By cooling the zeolite vessel, a reduced pressure will be formed here as well.

3. Freeze Drying

By mixing the carrots with the zeolite, a deeper vacuum will be formed, so that the water in the product will freeze. The frozen product will still be dried, the sublimation heat is supplied through the adsorption heat of the zeolite. The zeolite thereby remains at about 20° C., so that the high adsorption capacity is retained. If required, external cooling or heating may be effected to maintain the temperature. The amount of needed zeolite can be calculated on the basis of the amount of moisture to be removed from the product.

The invention claimed is:

1. A method for removing water from a gas product, comprising the steps of:
   bringing said gas product into contact with an adsorbent for water, whereby the adsorbent removes water from the gas product;
   regenerating said adsorbent with superheated steam, thus providing a second steam, which second steam comprises at least a part of said water from the gas product; and
   wherein said gas product is a gas stream originating from a low temperature drying step for removing water.

2. A method according to claim 1, wherein said adsorbent comprises a zeolite.

3. A method according to claim 2, wherein the zeolite is a 3A, 4A and/or 5A zeolite.

4. A method according to claim 1, wherein said second steam has a temperature of at least 120° C.

5. A method according to claim 1, wherein said second steam has a pressure of at least 3 bara.

6. A method according to claim 1, wherein said gas product is from a freeze drying process.

7. An apparatus for carrying out a method according to claim 1, comprising
   a dryer, optionally a spray dryer, comprising a first space for bringing a material to be dried into contact with a gas product;
   a second space for bringing the gas product into contact with an adsorbent to take up water from the gas product; and
   a third space for regenerating said adsorbent with superheated steam, thus providing a second steam, which second steam comprises at least a part of the water from the gas product.

8. An apparatus for carrying out a method according to claim 2, comprising
   a dryer, optionally a spray dryer, comprising a first space for bringing a material to be dried into contact with a gas product;
   a second space for bringing said gas product into contact with said zeolite to take up water from the gas product; and
   a third space for regenerating said adsorbent with superheated steam, thus providing a second steam, which second steam comprises at least a part of the water from the gas product.

9. An apparatus for carrying out a method according to claim 3, comprising
   a dryer, optionally a spray dryer, comprising a first space for bringing a material to be dried into contact with a gas product;
   a second space for bringing said gas product into contact with said zeolite to take up water from the gas product; and
   a third space for regenerating said adsorbent with superheated steam, thus providing a second steam, which second steam comprises at least a part of the from the gas product.

10. An apparatus for carrying out a method according to claim 4, comprising
   a dryer, optionally a spray dryer, comprising a first space for bringing a material to be dried into contact with a gas product;
   a second space for bringing said gas product into contact with said zeolite to take up water from the gas product; and a third space for regenerating said adsorbent with superheated steam, thus providing a second steam, which second steam comprises at least a part of the water from the gas product.

11. An apparatus for carrying out a method according to claim 5, comprising
- a dryer, optionally a spray dryer, comprising a first space for bringing a material to be dried into contact with a gas product;
- a second space for bringing said gas product into contact with said zeolite to take up water from the gas product; and
- a third space for regenerating said adsorbent with superheated steam, thus providing a second steam, which second steam comprises at least a part of the water from the gas product.

12. An apparatus for carrying out a method according to claim 6, comprising
- a dryer, optionally a spray dryer, comprising a first space for bringing a material to be dried into contact with a gas product;
- a second space for bringing said gas product into contact with said zeolite to take up water from the gas product; and
- a third space for regenerating said adsorbent with superheated steam, thus providing a second steam, which second steam comprises at least a part of the water from the gas product.

13. An apparatus for carrying out a method according to claim 1, comprising
- dryer means for bringing a material to be dried into contact with a gas product;
- means for bringing the gas product into contact with an adsorbent to take up water from the gas product; and
- means for regenerating the adsorbent with superheated steam, thus providing a second steam, which second steam comprises at least a part of the water from the gas product.

14. The apparatus of claim 7 wherein said dryer is a said spray dryer.

* * * * *